United States Patent [19]

Matsunami et al.

[11] 4,283,076
[45] Aug. 11, 1981

[54] SEATBELT SYSTEM

[75] Inventors: Muneharu Matsunami; Toshio Saito; Akio Yoshida; Nobuyuki Inokuchi, all of Aichi, Japan

[73] Assignees: Toyota Jidosha Kogyo Kabushiki Kaisha; Kabushiki Kaisha Tokai Rika Denki Seisakusho, both of Aichi, Japan

[21] Appl. No.: 89,443

[22] Filed: Oct. 30, 1979

[30] Foreign Application Priority Data

Oct. 30, 1978 [JP] Japan .................... 53-149154[U]

[51] Int. Cl.³ .............................................. B60R 21/10
[52] U.S. Cl. .................................................. 280/806
[58] Field of Search ............. 280/801, 802, 803, 804, 280/806, 807, 808; 242/107, 107.2, 107.4 R, 136 K, 194; 24/68 R, 68 SB, 68 CD, 73 AC; 297/468, 469, 474, 475, 476, 477, 478, 479, 480, 481

[56] References Cited

U.S. PATENT DOCUMENTS

| 3,847,434 | 11/1974 | Neman | 297/478 |
| 4,163,530 | 8/1979 | Kondo et al. | 242/107.2 |
| 4,201,401 | 5/1980 | Brynn | 280/808 |

FOREIGN PATENT DOCUMENTS 2435767  5/1976  Fed. Rep. of Germany ........... 280/808

Primary Examiner—Joseph F. Peters, Jr.
Assistant Examiner—Randall A. Schrecengost
Attorney, Agent, or Firm—Koda and Androlia

[57] ABSTRACT

A seatbelt system wherein the intermediate portions of an outer webbing for restraining an occupant are turned back at slip anchors provided at the upper and lower portions of a vehicle door, whereby, in the normal running condition of the vehicle, relative movement between the webbing and the slip anchors allows the occupant to have high freedom in moving, and, in an emergency of the vehicle, when the occupant is moved by an inertial force in the direction of a collision, relative movement between the webbing and the slip anchors is prevented to restrain the occupant, thus preventing the upper body of the occupant from being thrown out in the direction of the collision.

6 Claims, 6 Drawing Figures

SEATBELT SYSTEM

BACKGROUND OF THE INVENTION

1. Field of the Invention

This invention relates to a seatbelt system for restraining and protecting an occupant in an emergency of a vehicle such as a collision, and particularly to a seatbelt system capable of automatically fastening a restraining webbing to the occupant.

2. Description of the Prior Art

Heretofore, there have been proposed seatbelt systems for automatically fastening the seatbelt system to the occupant after he is seated so as to reliably protect the occupant in an emergency of the vehicle.

In the seatbelt system as described above in FIG. 1 and in U.S. Pat. No. 4,252,342 filed on Mar. 8, 1979, one end of an inner webbing 10 is wound up by a biasing force into a retractor 12 provided at the substantially central portion of the vehicle, and a through-ring 14 is secured to the other end of the inner webbing 10. Said retractor 12 is one end of an inner webbing 10 is wound up by a biasing force into a retractor 12 provided at the substantially central portion of the vehicle, and a through-ring 14 is secured to the other end of the inner webbing 10. Said retractor 12 is a so-called emergency locking retractor for suddenly interrupting the wind-off rotation of the webbing only in an emergency of the vehicle.

One end of an outer webbing 16 is secured to a portion adjacent the upper end of a door 18 through a buckle device 20, the other end thereof is secured to a portion adjacent the lower end of the door 18 through an anchor device 22, and the intermediate portion thereof is turned back at said through-ring 14.

With the seatbelt system as arranged above, when the occupant opens the door 18 for entering the vehicle, the inner webbing 10 is wound off by a required length from the retractor 12 and a sufficient space for allowing the occupant to enter the vehicle between the inner webbing 10 and an occupant's seat 24. Consequently, when the occupant closes the door 18 upon being seated at the seat 24, the inner webbing is wound up by a wind-up force of the retractor 12, whereby the outer webbing 16 turned back at the through-ring 14 is automatically fastened to the shoulder and waist of the occupant, respectively.

Description will hereunder be given of the restraining condition of the seatbelt system with the above arrangement at the time of collision of the vehicle with referenece to FIGS. 2A through 2C. FIG. 2A shows the normal running condition of the vehicle. If the vehicle falls into a collision from the condition as described above, then the retractor 12 instantaneously interrupts the wind-off rotation of the webbing 10, and the occupant moves forward in parallel with the movement of the vehicle by a value of clearances between the webbing 10 and himself and between the webbing 16 and himself by an inertial force of collision as shown in FIG. 2B. Subsequently, the head of the occupant 26 moves forward in the vehicle, rotating on the waist of the occupant 26. This rotating movement is a phenomenon resulted from the fact that the outer webbing 16 moves through the through-ring 14 in the direction of the buckle device 20, i.e. the direction of the restrained shoulder of the occupant. It follows that the head of the occupant may dash against a steering wheel 28 and the like, thus causing injuries to the occupant.

SUMMARY OF THE INVENTION

The present invention contemplates to obviate the above-described disadvantages, and therefore, one object of the present invention is to provide a seatbelt system wherein, even with an automatically fastening type seatbelt system, the occupant is prevented from dashing his head against a dangerous obstacle, thus improving the safety of the occupant.

In the seatbelt system according to the present invention, the intermediate portions of an outer webbing are inserted through and turned back at slip anchors, respectively, whereby, in a collision of a vehicle, a waist restraining portion of the outer webbing is prevented from moving in the direction of a shoulder restraining portion of the outer webbing due to friction force generated between the outer webbing and the slip anchors, thereby improving the safety of an occupant.

Description will hereunder be given of one embodiment of the present invention with reference to the drawings.

DESCRIPTION OF THE PREFERRED EMBODIMENT

Figure 1:
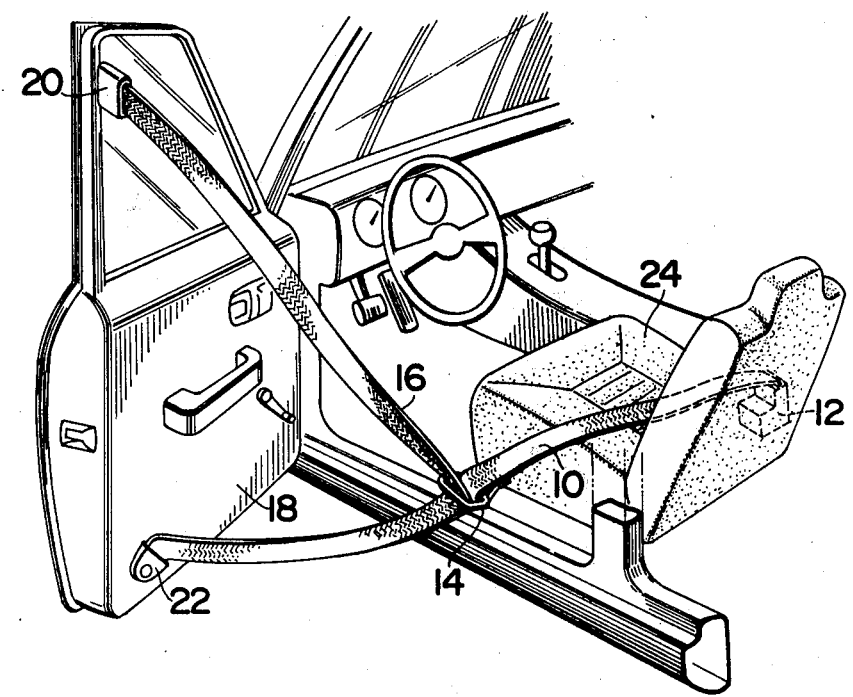
FIG. 1 is a perspective view showing the seatbelt system of the prior art.
Figure 2A:
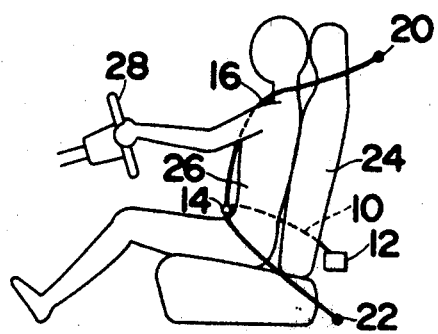
FIGS. 2A through 2C are side views showing the behavior of the occupant in a collision of the vehicle of FIG. 1.
Figure 2B:
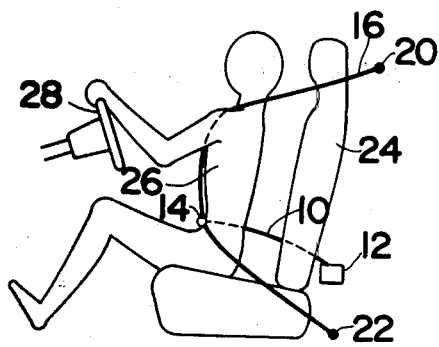
Figure 2C:
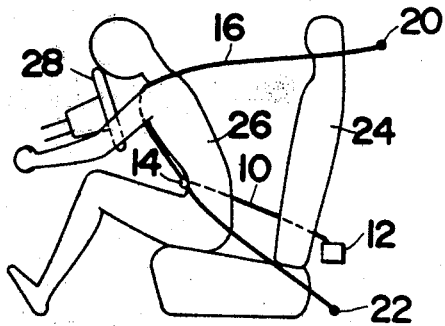
Figure 3:
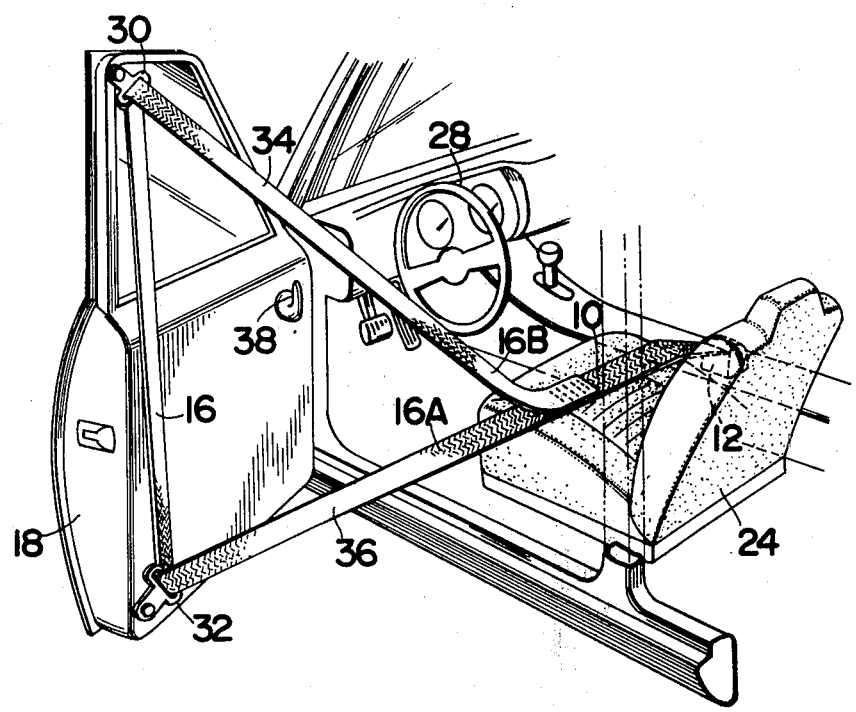
FIG. 3 is a perspective view showing one embodiment of the seatbelt system according to the present invention.

As shown in FIG. 3, one end of the inner webbing 10 is wound up by the retractor 12 secured to the center of the vehicle in the same manner as in the prior art. Said retractor 12 is a so-called emergency locking retractor provided therein with an inertia lock mechanism for winding up the inner webbing 10 by its biasing force, and for preventing said webbing 10 from being wound off only in an emergency of the vehicle such as a collision.

On the other hand, the intermediate portions of the outer webbing 16 are inserted through and turned back at slip anchors 30, 32, which are rotatably secured to the upper and lower portions of the door 18, respectively, and said webbing 16 is movable in the longitudinal direction.

Furthermore, the opposite ends 16A, 16B of said outer webbing 16 are connected to the forward end of the inner webbing 10. Here, it is preferable that, when said end 16A and the inner webbing 10 are connected to each other, the joint has a seamless construction, i.e., the inner webbing 10 and outer webbing 16 is integrally formed into a single webbing.

With the arrangement as described above, a portion between one end 16B of the outer webbing 16 and the slip anchor 30 constitutes a shoulder restraining portion 34, and a portion between the other end 16A and the slip anchor 32 constitutes a waist restraining portion 36.

Additionally, provided on the door 18 is a hook 38 on which the joint between the inner webbing 10 and the outer webbing 16 is hung.

In the present embodiment as arranged above, if the occupant opens the door 18 for entering the vehicle as shown in FIG. 3, then the inner webbing 10 is wound off by a required length against the wind-up force of the retractor 12. Hence, it is possible for the occupant to insert himself into a space formed between said inner webbing 10 and the seat 24 so as to be seated.

If the occupant closes the door 18 upon being seated, then the remaining portion of the inner webbing 10 is wound up by the retractor 12 again, whereby the shoulder restraining portion 34 and the waist restraining portion 36 are fastened to the shoulder and waist of the occupant thus seated, respectively.

In the normal running condition of the vehicle, the retractor 12 can freely wind off the inner webbing 10 therefrom, whereby the occupant can arbitrarily change his driving posture. Since no high tensile force acts on the outer webbing 16, the lengths of the shoulder restraining portion 34 and waist restraining portion 36 can be freely shifted to one way or the other, i.e. either the shoulder straining portion 34 or the waist restraining portion 36 is shifted to one way or the other through the slip anchors 30 and 32, so that more comfortable driving posture can be obtained.

Figure 4:
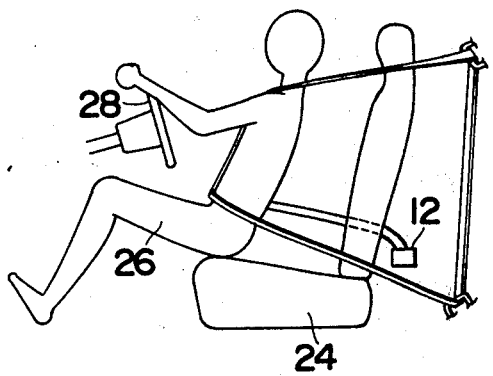
FIG. 4 is a side view showing the behavior of the occupant in a collison.

Next, in the case the vehicle is fallen into an emergency such as a collision of the vehicle, an inertia lock sensor in the retractor 12 operated to instantaneously prevent the inner webbing 10 from being wound off. At the same time, the occupant 26 is moved forward in the vehicle by an inertial force of the collision as shown in FIG. 4. Due to this movement of the occupant a high tensile force is generated in the outer webbing 16, said tensile force generating a high frictional force between the outer webbing 16 and the slip anchors 30, 32. From this reason, in the outer webbing 16, the lengths of the shoulder restraining portion 34 and the waist restraining portion 36 are not shifted to one way or the other, and said shoulder restraining portion 34 and said waist restraining portion 36 operate as if they are fixed on the door 18 through the slip anchors 30 and 32, respectively.

From this reason, the head of the occupant 26 does not move forward in the vehicle as shown in FIG. 4, thus evading to dash against a dangerous obstacle.

As has been described so far, in the seatbelt system according to the present invention, the intermediate portions of the outer webbing are inserted through the slip anchors secured to the upper and lower portions of the door, whereby such advantages can be offered that, in the normal running condition of the vehicle, the webbings can be moved in the longitudinal direction thereof in accordance with the driving posture of the occupant, and, in an emergency of the vehicle, the webbings are prevented from being moved in an emergency of the vehicle, thereby improving the safety of the occupant.

In the case the occupant leaves the vehicle after the normal running of the vehicle is completed, if the joint of the outer webbing 16 with the inner webbing 10 is hung on the hook 38 after the door 18 is opened, then the space for the occupant to enter or leave the vehicle is enlarged, thereby enabling the action of entering or leaving the vehicle to be comfortable. Furthermore, if said hook 38 is made reversible to be directed downwardly in association with the closing action of the door 18, then the webbings can be automatically fastened to the occupant only by his entering the vehicle.

What is claimed is:

1. A seatbelt system comprising:
   (a) an inner webbing;
   (b) an outer webbing whose opposite ends are secured to one end of said inner webbing;
   (c) an emergency locking retractor for winding up the other end of said inner webbing by its biasing force and preventing said inner webbing from being wound off in an emergency of the vehicle, said retractor being secured to the substantially central portion of the vehicle; and
   (d) a pair of slip anchors provided at the upper and lower portion of a vehicle door for turning back the intermediate portions of said outer webbing, the portion between one of the slip anchors and one end of the inner webbing constituting a waist restraining portion for an occupant and another portion between the other of the slip anchors and one end of the inner webbing constituting a shoulder restraining portion for the occupant; whereby the vehicle is opened or closed so as to automatically fasten the webbings to the occupant.

2. A seatbelt system as set forth in claim 1, wherein said slip anchors are rotatably secured to the vehicle door.

3. A seatbelt system an set forth in claim 1, wherein said outer webbing is connected at one end to one end of the inner webbing and said both webbings are integrally formed into a single continuous webbing.

4. A seatbelt system as set forth in claim 1, wherein said vehicle door is further provided thereon with an additional hook where a point at which both webbings are secured together can be hung.

5. A three-point type seatbelt system comprision a lap inner webbing, a lap outer webbing and a shoulder webbing, wherein: intermediate portions of said lap outer webbing and shoulder webbing are turned back at slip anchors provided at the upper and lower portions of the vehicle door, respectively; thereafter, ends of said webbings are connected together; and, in the normal running condition of the vehicle, said both webbings are made slidable with the slip anchors, and, in an emergency of the vehicle, said sliding movement of the webbing is prevented due to frictional force between the webbings and the slip anchors.

6. A seatbelt system comprising:
   (a) a webbing for restraining an occupant;
   (b) an emergency locking retractor secured to the substantially central portion of the vehicle for winding up one end of said webbing and preventing said webbing from being wound off in an emergency;
   (c) a first slip anchor provided at the lower portion of the door for turning back the intermediate portion of said webbing, said slip anchor allowing the webbing to move in the longitudinal direction in the normal running condition of the vehicle and preventing the webbing from moving in the condition where tension of the webbing is increased; and
   (d) a second slip anchor provided at the upper portion of the door for turning back the webbing which has been turned back at said first slip anchor, said second slip anchor allowing the webbing to move in the longitudinal direction in the normal running condition of the vehicle and preventing the webbing from such moving as above in the condition where tension of the webbing is increased, and the forward end of the webbing turned back at the second slip anchor being engaged with the intermediate portion of the webbing between the first slip anchor and the retractor; whereby, in the normal running condition of the vehicle, the webbing slides on the slip anchors to make the driving posture changeable, and, in an emergency, the occupant is slightly moved in the direction of a collision, and thereupon, relative movement between the webbing and the slip anchors is prevented to restrain the occupant, thus preventing the head of the occupant from being thrown out in the direction of the collision.

* * * * *